US012430908B2

(12) United States Patent
Kim et al.

(10) Patent No.: US 12,430,908 B2
(45) Date of Patent: Sep. 30, 2025

(54) METHOD AND APPARATUS FOR DIAGNOSING ERROR OF OBJECT PLACEMENT USING ARTIFICIAL NEURAL NETWORK

(71) Applicant: KOREA INSTITUTE OF SCIENCE AND TECHNOLOGY, Seoul (KR)

(72) Inventors: Donghun Kim, Seoul (KR); Sang Soo Han, Seoul (KR); Leslie Tiong Ching Ow, Seoul (KR); Hyukjun Yoo, Seoul (KR); Nayeon Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 379 days.

(21) Appl. No.: 18/334,030

(22) Filed: Jun. 13, 2023

(65) Prior Publication Data

US 2024/0378881 A1    Nov. 14, 2024

(30) Foreign Application Priority Data

May 8, 2023    (KR) .................. 10-2023-0059043

(51) Int. Cl.
*G06V 10/98* (2022.01)
*G06V 10/82* (2022.01)

(52) U.S. Cl.
CPC .............. *G06V 10/98* (2022.01); *G06V 10/82* (2022.01)

(58) Field of Classification Search
CPC ................................ G06V 10/98; G06V 10/82
See application file for complete search history.

(56) References Cited

U.S. PATENT DOCUMENTS

| | | | | |
|---|---|---|---|---|
| 10,223,610 B1* | 3/2019 | Akselrod-Ballin | ..... | G06T 7/174 |
| 2018/0150956 A1* | 5/2018 | Kao | .......................... | G06T 7/11 |
| 2021/0192714 A1* | 6/2021 | Bhatt | .................... | G06T 7/0004 |
| 2021/0287040 A1* | 9/2021 | Al-Qunaieer | ......... | G06T 7/0002 |
| 2022/0044441 A1* | 2/2022 | Kalra | ...................... | G06V 10/82 |
| 2022/0331964 A1* | 10/2022 | Spector | .................. | B25J 13/084 |
| 2023/0229119 A1* | 7/2023 | Zheng | ................ | G05B 13/0265 |
| | | | | 706/12 |
| 2023/0267724 A1* | 8/2023 | Graf | .......................... | G06T 7/70 |
| | | | | 382/156 |
| 2024/0051146 A1* | 2/2024 | Luan | ................... | G05B 19/4155 |
| 2024/0246240 A1* | 7/2024 | Teoh | ...................... | G06V 20/68 |

OTHER PUBLICATIONS

Basamakis, Fotios Panagiotis, et al. "Deep object detection framework for automated quality inspection in assembly operations." Procedia CIRP 115 (2022): 166-171. (Year: 2022).*

* cited by examiner

*Primary Examiner* — Utpal D Shah
(74) *Attorney, Agent, or Firm* — NSIP Law (57) ABSTRACT

There is provided a method and an apparatus for diagnosing an object placement error by using an artificial neural network by which feature data of the (N+1)-th stage among the feature data of a plurality of stages is generated by using any one feature data among a plurality of feature data generated in an operation process of a main network and feature data of the plurality of stages, and a placement error of at least one object is diagnosed by using an artificial neural network of a new structure, and thus, the diagnosis accuracy of a placement error of an object that is difficult to detect an edge, such as a transparent vial, may be greatly increased.

12 Claims, 6 Drawing Sheets

FIG. 6

METHOD AND APPARATUS FOR DIAGNOSING ERROR OF OBJECT PLACEMENT USING ARTIFICIAL NEURAL NETWORK

CROSS-REFERENCE TO RELATED APPLICATIONS

This application is based on and claims priority under 35 U.S.C. § 119 to Korean Patent Application No. 10-2023-0059043, filed on May 8, 2023, in the Korean Intellectual Property Office, the disclosure of which is incorporated by reference herein in its entirety.

BACKGROUND

1. Field

The present disclosure relates to a method and an apparatus for diagnosing whether an object is normally placed in a space.

2. Description of the Related Art

A case increases in which a work that is dangerous for human to perform is performed by a robot in an unmanned automated factory, an unmanned automated laboratory, and so on. For example, a process gradually increases in which a plurality of transparent vials are placed by a robot in an unmanned automated chemical laboratory. When the robot places the transparent vial in an incorrect state or a spot different from a preset spot, a serious safety accident problem may occur due to ejection of a reactive, reducing, or corrosive solution.

Image analysis technology using a convolutional neural network (CNN) is increasingly used for surveillance of unmanned automated processes. However, the known CNN is not suitable for diagnosing a placement error of a transparent vial because the detection accuracy of a transparent object is very low.

SUMMARY

The present disclosure provides an object placement error diagnosing method and an object placement error diagnosing apparatus by which the diagnosis accuracy of a placement error of an object whose edge is difficult to detect, such as a transparent vial, may be greatly increased. Objects of the present disclosure are not limited to the object described above, and other technical objects may be derived from the following description.

According to an aspect of the present disclosure, an object placement error diagnosing method includes inputting, to an artificial neural network, at least one input image representing a space in which at least one object is placed, and acquiring data representing a diagnosis result of a placement error of the at least one object from an output of the artificial neural network.

According to another aspect of the present disclosure, an object placement error diagnosing apparatus includes a processor configured to input, to an artificial neural network, at least one input image representing a space in which at least one object is placed, and to acquire data representing a diagnosis result of a placement error of the at least one object from an output of the artificial neural network.

The artificial neural network includes a main network configured to perform a convolution operation and a pooling operation on the at least one input image multiple times, and a pyramid network configured to generate feature data of a plurality of stages for generating data representing the diagnosis result of the placement error of the at least one object by using a plurality of feature data generated in an operation process of the main network.

Feature data of an (N+1)-th stage among the feature data of the plurality of stages is generated by using any one feature data among the plurality of feature data generated in the operation process of the main network and feature data of an N-th stage among the feature data of the plurality of stages.

The pyramid network includes an (N+1)-th feature block configured to generate the feature data of the (N+1)-th stage by using any one feature data among the plurality of feature data generated in the operation process of the main network and the feature data of the N-th stage, and an (N+2)-th feature block configured to generate feature data of an (N+2)-th stage by using any other feature data among the plurality of feature data generated in the operation process of the main network and the feature data of the (N+1)-th stage.

The pyramid network further includes an N-th reduction layer configured to perform a pooling operation and a convolution operation on the feature data of the N-th stage, and the (N+1)-th feature block generates the feature data of the (N+1)-th stage by performing a convolution operation and a pooling operation on any one feature data among the plurality of feature data generated in the operation process of the main network and feature data output as an operation result of the N-th reduction layer.

The pyramid network further includes an N-th pyramidal convolution layer for performing a convolutional operation on the feature data of the (N+2)-th stage, an (N+2)-th reduction layer configured to perform a pooling operation and a convolution operation on the feature data of the (N+2)-th stage, and an (N+3)-th feature block configured to generate feature data of an (N+3)-th stage by using feature data output as an operation result of the N-th pyramidal convolution layer and feature data output as an operation result of the (N+2)-th reduction layer.

The main network includes a plurality of transition layers for performing a convolution operation and a pooling operation on any one feature data among the plurality of feature data generated in the operation process of the main network such that a size of a feature map is reduced, and the feature data of the (N+1)-th stage is generated by using feature data output as an operation result of any one of the plurality of transition layers and the feature data of the N-th stage among the feature data of the plurality of stages.

The main network further includes a plurality of dense block layers that are inserted between the plurality of transition layers and perform a convolution operation on feature data output as an operation result of a previous transition layer according to a DenseNet model such that sizes of feature maps are equal to each other.

The pyramid network includes a first feature block configured to generate feature data of a first stage by performing a convolution operation and a pooling operation on any one feature data among the plurality of feature data generated in the operation process of the main network, and a second feature block configured to generate feature data of a second stage by using any other feature data among the plurality of feature data generated in the operation process of the main network and the feature data of the first stage output as an operation result of the first feature block.

The at least one object is at least one transparent vial, and the object placement error diagnosing method further includes generating the at least one input image from a captured image of a tray on which the at least one transparent vial is placed.

The artificial neural network further includes a detection layer for generating each class score representing a diagnosis result of the placement error of the at least one object for each stage by using feature data of each stage.

Each class score includes a value representing success or failure of placement of each object, a probability value of success or failure of the placement of each object, a value representing a position of a bounding box of each object, and a value representing a size of the bounding box of each object, and the artificial neural network further includes a non-maximum suppression (NMS) layer for selecting any one class score from among a plurality of class scores generated in the detection layer by using a non-maximum suppression (NMS) algorithm and outputting the selected one class score as data representing a diagnosis result of the placement error of the at least one object.

According to another aspect of the present disclosure, a computer-readable recording medium includes a program that is recorded thereon and causes a computer to perform the object placement error diagnosing method.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments of the present disclosure are described in detail with reference to the accompanying drawings. Hereinafter, a method and an apparatus for diagnosing an object placement error, which may greatly increase the accuracy of diagnosing a placement error of an object that is difficult to detect edges, such as a transparent vial. Hereinafter, the method and the apparatus are respectively briefly referred to as an "object placement error diagnosing method" and an "object placement error diagnosing device".

Figure 1:
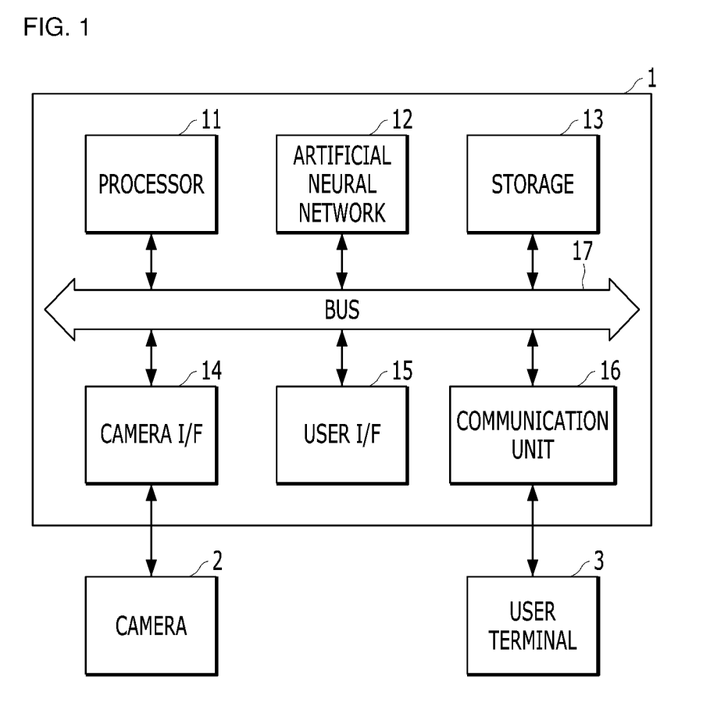
FIG. 1 is a block diagram of an apparatus for diagnosing an object placement error, according to an embodiment of the present disclosure.

FIG. 1 is a block diagram of an object placement error diagnosing device 1 according to an embodiment of the present disclosure. Referring to FIG. 1, the object placement error diagnosing device 1 according to the present embodiment includes a processor 11, an artificial neural network 12, a storage 13, a camera interface 14, a user interface 15, a communication unit 16, and a bus 17. In order to make the present embodiment be easily understandable and prevent characteristics of the present embodiment from being obscured, FIG. 1 illustrates essential components of the present embodiment. Those skilled in the art to which the present embodiments pertain may understand that another component may be added thereto in addition to the components illustrated in FIG. 1.

The processor 11 processes data input from the camera interface 14, the user interface 15, and the communication unit 16, and outputs data to the camera interface 14, the user interface 15, and the communication unit 16. The processor 11 reads data from the storage 13 or stores data in the storage 13. In particular, the processor 11 of the present embodiment reads a program from the storage 13 and executes the program for performing an object placement error diagnosing method illustrated in FIG. 3. The processor 11 may be implemented with a plurality of processing units, such as a central processing unit (CPU) and a graphics processing unit (GPU).

The artificial neural network 12 belongs to a convolutional neural network (CNN) classification that receives an image and outputs a prediction result for the input image, and outputs diagnostic data for the image input from the processor 11. The artificial neural network 12 may be implemented by a field programmable gate array (FPGA) or a computer program. The storage 13 stores a programs for performing the object placement error diagnosing method illustrated in FIG. 3 and data. When the artificial neural network 12 is implemented by a computer program, the storage 13 may store the artificial neural network 12 implemented by the computer program.

The camera interface 14 serves as an interface between the camera 2 and the processor 11. The user interface 15 receives commands or information from a user or displays images and messages to the user. The user interface 15 may be implemented with a display panel, a touch screen, or so on. The communication unit 16 communicates with other electronic devices, such as a user terminal 3 and so on according to various communication methods, such as long term evolution (LTE), WiFi, and the Bluetooth. The bus 17 transfers data between the processor 71 and various components.

Figure 2:
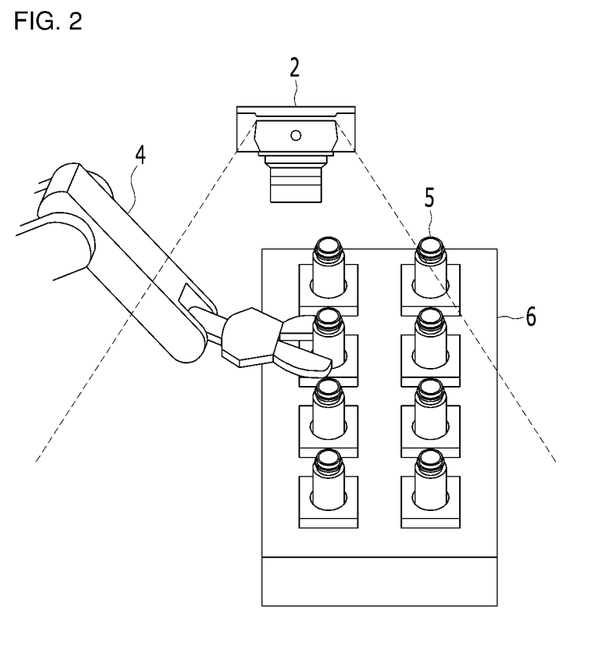
FIG. 2 is an example view of an imaging environment of a camera illustrated in FIG. 1.

FIG. 2 is an example view of an imaging environment of the camera 2 illustrated in FIG. 1. A case increases in which a robot 4 performs a work that is dangerous for a person to perform directly in an unmanned automated factory, an unmanned automated laboratory, and so on. For example, a process, in which a plurality of transparent vials 5 are placed on a tray 6 by the robot 4 in an unmanned automated chemical laboratory, gradually increases. When the robot 4 places the transparent vial 5 on the tray 6 in an incorrect state or places the transparent vial 5 in a different spot on the tray 6 from a preset spot, a serious safety accident problem may occur due to ejection of a reactive, reducing, or corrosive solution.

Figure 3:
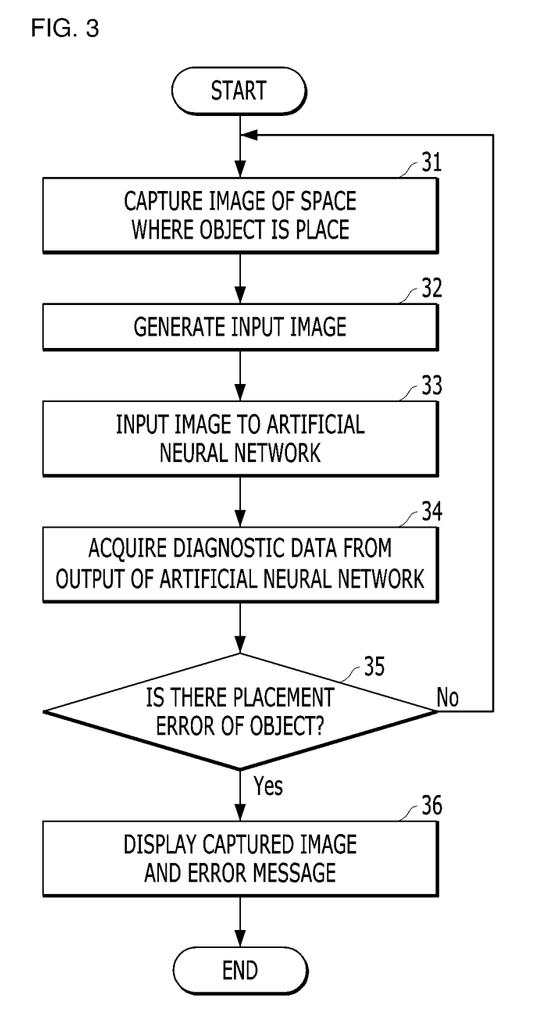
FIG. 3 is a flowchart of a method of diagnosing an object placement error, according to an embodiment of the present disclosure.

FIG. 3 is a flowchart of an object placement error diagnosing method according to an embodiment of the present disclosure. Referring to FIG. 3, the object placement error diagnosing method according to the present embodiment includes operations performed by the object placement error diagnosing apparatus 1 illustrated in FIG. 1.

In step 31, the camera 2 generates at least one image by imaging a space in which at least one object is placed. For example, the at least one object may be at least one transparent vial illustrated in FIG. 2. Whenever step 31 is performed once, the camera 2 may generate an image with a resolution of 1280×768 by imaging a tray on which the at least one transparent vial is placed. At least one object may include a beaker or a flask other than the transparent vial.

In step 32, the processor 11 receives the image generated by the camera 2 in step 31 from the camera 2 through the camera interface 14 and generates at least one input image to be input to the image generated by the camera 2 to the artificial neural network 12. For example, the processor 11 may generate an R component input image, a G component input image, and a B component input image with a resolution of 300×300 by down-sampling the image with a resolution of 1280×768.

In step 33, the processor 11 inputs, to the artificial neural network 12, at least one input image generated in step 32, that is, at least one input image representing a space in which at least one object is placed. For example, the processor 11 inputs the R component input image, the G component input image, and the B component input image with the resolution of 300×300 generated in step 32 to the artificial neural network 12.

In step 34, the processor 11 acquires diagnostic data representing a diagnosis result on a placement error of at least one object from the output of the artificial neural network 12 in response to the input image in step 33.

Figure 4A:
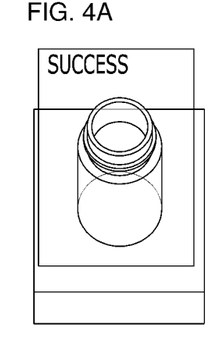
FIGS. 4A and 4B illustrate various states of a transparent vial placed on a tray.
Figure 4B:
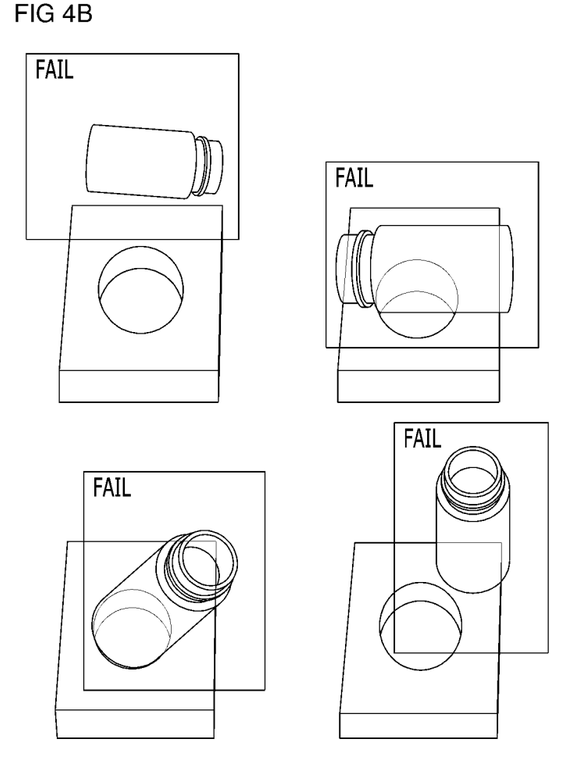

FIGS. 4A and 4B are views illustrating various states of the transparent vial 5 placed on the tray 6. FIG. 4A illustrates a state in which the transparent vial 5 is normally placed on the tray 6. FIG. 4B illustrates a state in which the transparent vial 5 is abnormally placed on the tray 6. When the transparent vial 5 is placed as illustrated in FIG. 4A, diagnostic data representing successful placement of the transparent vial is output from the artificial neural network 12. When the transparent vial 5 is placed as illustrated in FIG. 4B, diagnostic data representing placement failure of the transparent vial is output from the artificial neural network 12.

Figure 5:
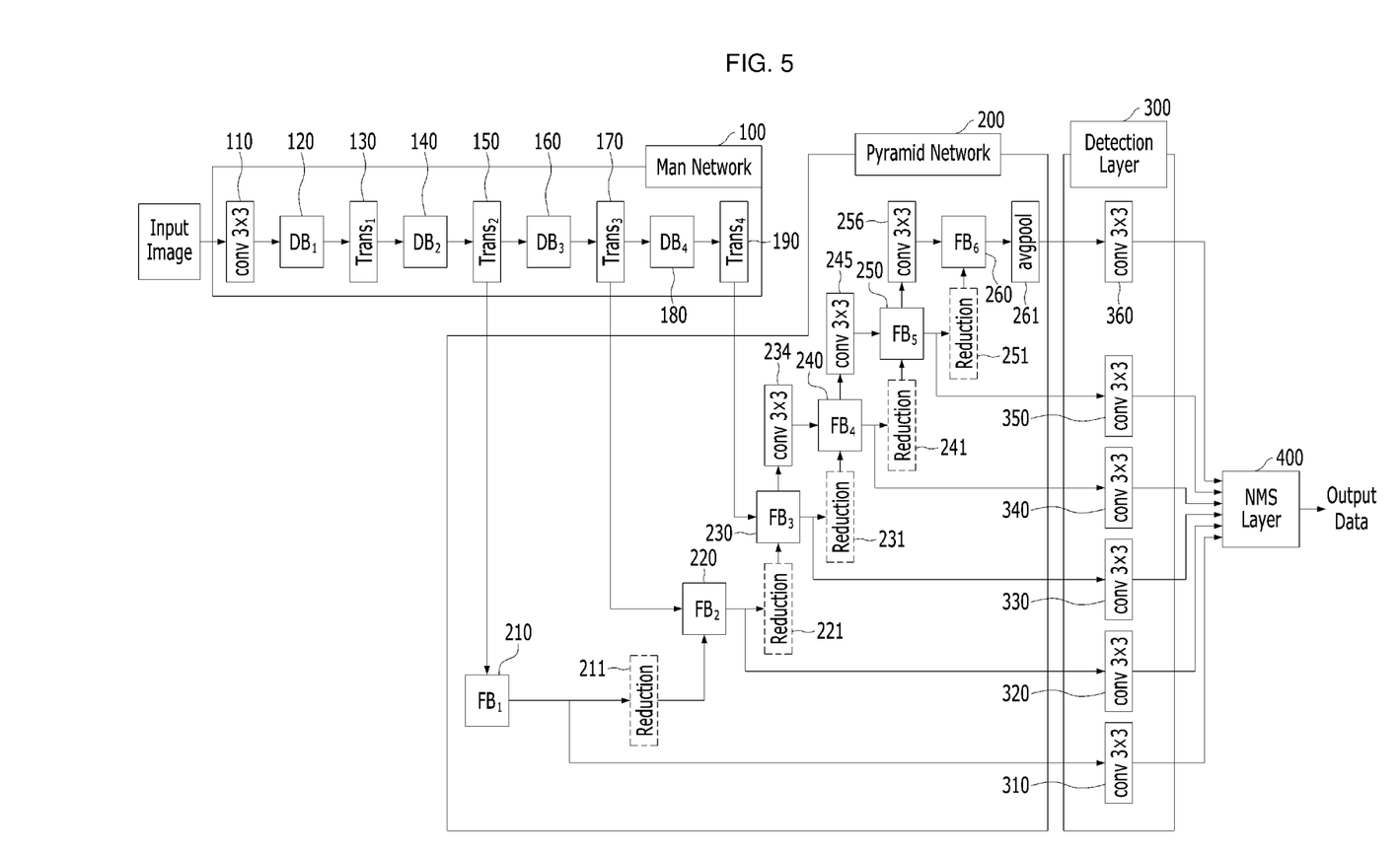
FIG. 5 is configuration diagram of an artificial neural network illustrated in FIG. 1.

FIG. 5 is a configuration diagram of the artificial neural network 12 illustrated in FIG. 1. Referring to FIG. 5, the artificial neural network 12 illustrated in FIG. 1 includes a main network 100, a pyramid network 200, a detection layer 300, and a non-maximum suppression (NMS) layer 400. Hereinafter, feature data to be generated in an operation process of the artificial neural network 12 indicates a feature map of a CNN model.

The main network 100 performs a convolution operation and a pooling operation multiple times on at least one input image generated in step 32. The main network 100 includes a main convolution layer 110, a plurality of dense block layers 120, 140, 160, and 180, and a plurality of transition layers 130, 150, 170, and 190. The plurality of dense block layers 120, 140, 160, and 180 and the plurality of transition layers 130, 150, 170, and 190 correspond respectively to a dense block layer and a transition layer of a densely-connected convolution network (DdenseNet) model.

The main convolution layer 110 performs the convolution operation on at least one input image generated in step 32. Each of the dense block layers 120, 140, 160, and 180 performs a batch normalization (BN) operation, a rectified linear unit (ReLU) operation, and the convolution operation multiple times on the feature data input from a previous layer. When one BN operation, one ReLu operation, and one convolution operation are considered as one layer, feature maps of all previous layers in the dense block layers 120, 140, 160, and 180 are used as inputs to all subsequent layers. Accordingly, the sizes of the feature maps are constantly the same each other during the operation process of each of the dense block layers 120, 140, 160, and 180.

In this way, each of a second dense block layer 140, a third dense block layer 160, and a fourth dense block layer 180 is inserted between the plurality of transition layers 130, 150, 170, and 190 and performs the BN operation, the Relu operation, and the convolution operation multiple times on the feature data output from the previous transition layer as a result of the operation of the previous transition layer according to the DenseNet model such that the sizes of the feature maps are equal to each other. The plurality of dense block layers 120, 140, 160, and 180 alleviate a vanishing-gradient problem that gradients disappear and strengthen feature propagation.

Each of the transition layers 130, 150, 170, and 190 performs the convolution operation and an average pooling operation on one feature data among a plurality of feature data generated in the operation process of the main network 100, that is, feature data output as a result of an operation of the previous dense block layer such that the sizes of the feature maps are reduced. A basic structure of the CNN model repeats an operation of gradually increasing the dimension of a feature map while gradually decreasing the sizes of the feature maps. The transition layers 130, 150, 170, and 190 reduce the sizes of the feature maps according to the basic structure of the CNN model.

Hereinafter, an operation example of the main network 100 for the R component input image, the G component input image, and the B component input image with a resolution of 300×300 is described. When description on a stride is omitted below, the stride is 1.

The main convolution layer 110 performs a convolution operation of 64 300×300 filters with a stride of 2 on the R component input image, the G component input image, and the B component input image with a resolution of 300×300. In this case, the feature data output from the main convolution layer 110 as an operation result of the main convolution layer 110 becomes a 150×150×64 feature map. Here, "150×150" is the size of the feature map, that is, a width and a height, and "64" is the dimension of the feature map.

The first dense block layer 120 performs a 1×1 convolution operation and a 6×6 convolution operation on the 150×150×64 feature map output from the main convolution layer 110 as an operation result of the main convolution layer 110 six times. In order to prevent the description of each dense block layer 120, 140, 160, and 180 from being redundant, descriptions of the BN operation and the ReLu operation are omitted. The first transition layer 130 performs a 1×1 convolution operation and a 2×2 average pooling operation with a stride of 2 on a 150×150×256 feature map output from the first dense block layer 120 as an operation result of the first dense block layer 120.

The second dense block layer 140 performs a 1×1 convolution operation and a 6×6 convolution operation eight times on a 75×75×256 feature map output from the first transition layer 130 as an operation result of the first transition layer 130. The second transition layer 150 performs a 1×1 convolution operation and a 2×2 average pooling operation with a stride of 2 on a 75×75×512 feature map output from the second dense block layer 120 as an operation result of the second dense block layer 140.

The third dense block layer 160 performs a 1×1 convolution operation and a 6×6 convolution operation 16 times on a 38×38×512 feature map output from the second transition layer 150 as an operation result of the second transition layer 150. The third transition layer 170 performs a 1×1 convolution operation and a 2×2 average pooling operation with a stride of 2 on a 38×38×1024 feature map output from the third dense block layer 160 as an operation result of the third dense block layer 160.

The fourth dense block layer 180 performs a 1×1 convolution operation and a 6×6 convolution operation six times on a 19×19×512 feature map output from the third transition layer 170 as an operation result of the third transition layer 170. The fourth transition layer 190 performs a 1×1 convolution operation and a 2×2 average pooling operation with a stride of 2 on a 19×19×768 feature map output from the fourth dense block layer 180 as an operation result of the fourth dense block layer 180. In particular, the fourth transition layer 190 greatly reduces the size and dimension of the feature map, and thus, an overfitting problem is reduced and operation efficiency is increased.

The pyramid network 200 generates feature data of a plurality of stages for generating data representing a diagnosis result of a placement error of at least one object by using a plurality of feature data generated in the operation process of the main network 100. The pyramid network 200 includes a plurality of feature block layers 210, 220, 230, 240, 250, and 260), a plurality of reduction layers 211, 221, 231, 241, and 251, a plurality of pyramid convolution layers 234, 245, and 256, and a pyramid pooling layer 261.

A basic structure of the pyramid network 200 is as follows. The (N+1)-th feature block of the plurality of feature blocks 210, 220, 230, 240, 250, and 260 generates feature data of the (N+1)-th stage by using feature data of the N-th stage and any one feature data among a plurality of feature data generated in the operation process of the main network 100, that is, feature data output as an operation result of any one of the plurality of transition layers 130, 150, 170, and 190. The (N+2)-th feature block generates feature data of the (N+2)-th stage by using feature data of the (N+1)-th stage and any other feature data among the plurality of feature data generated in the operation process of the main network 100, that is, feature data output as an operation result of any one of the plurality of transition layers 130, 150, 170, and 190.

As described above, the feature data of the (N+1)-th stage among the feature data of a plurality of stages is generated by using any one feature data among the plurality of feature data generated in the operation process of the main network 100 and the feature data of the N-th stage among the feature data of the plurality of stages, and the feature data of the (N+2)-th stage is generated by using any other feature data among the plurality of feature data generated in the operation process of the main network 100 and the feature data of the (N+1)-th stage among the feature data of the plurality of stages.

When an object is a transparent vial, it is very difficult to detect an edge of the transparent vial, and thus, when a placement error of the transparent vial is diagnosed by using the conventional CNN, the accuracy of the diagnosis is greatly reduced. According to the present embodiment, characteristics of an edge of a transparent vial are extracted by a new artificial neural network structure generated by using any one feature data among a plurality of feature data generated in the operation process of the main network 100 and feature data of the previous stage, and as a result, diagnosis accuracy of a placement error of the transparent vial may be greatly increased.

The N-th reduction layer of the plurality of reduction layers 211, 221, 231, 241, and 251 performs a pooling operation and a convolution operation on feature data of the N-th stage. When an (N+1)-th reduction layer is added, the (N+1)-th reduction layer performs a pooling operation and a convolution operation on the feature data of the (N+1)-th stage. Similarly, the (N+2)-th reduction layer performs a pooling operation and a convolution operation on the feature data of the (N+2)-th stage. The (N+1)-th feature block generates the feature data of the (N+1)-th stage by performing a convolution operation and a pooling operation on any one feature data among a plurality of feature data generated in the operation process of the main network 100 and the feature data output as an operation result of the N-th reduction layer. Another feature block may be added to the architecture described above.

The N-th pyramid convolution layer among the plurality of pyramid convolution layers 234, 245, and 256 performs a convolution operation on feature data of the (N+2)-th stage. When the (N+1)-th pyramid convolution layer is added, the (N+1)-th pyramid convolution layer performs a convolution operation on feature data of the (N+3)-th stage. Similarly, the (N+2)-th pyramidal convolution layer performs a convolution operation on the feature data of the (N+3)-th stage. The (N+3)-th feature block generates the feature data of the (N+3)-th stage by using the feature data output as a result of the operation of the N-th pyramidal convolution layer and the feature data output as a result of the operation of the (N+2)-th reduction layer.

As described above, even when an operation result of the main network 100 is not used, a feature block of a higher stage may be added. As the number of feature blocks increases, the diagnosis accuracy of a placement error of a transparent vial may be increased, but the amount of operation of the artificial neural network 12 greatly increases, and accordingly, real-time diagnosis of a placement error of the transparent vial may be difficult. It is preferable to design the number of feature blocks by considering the performance and diagnosis accuracy of a computer to which the present embodiment is applied.

Hereinafter, an operation example of the pyramid network 200 on an operation result of the main network 100 for an R component input image, a G component input image, and a B component input image with a resolution of 300×300 is described.

The first feature block 210 performs the same operation as an operation of the second transition layer 150 on a 38×38×512 feature map output from the second transition layer 150 as a result of an operation of the second transition layer 150. That is, the first feature block 210 performs a 1×1 convolution operation and a 2×2 average pooling operation with a stride of 2 on the 38×38×512 feature map output from the second transition layer 150. The first reduction layer 211 performs a 2×2 average pooling operation and a 1×1 convolution operation on a 38×38×512 feature map output from the first feature block 210 as an operation result of the first feature block 210.

The second feature block 220 sequentially performs the same operation as operations of the first reduction layer 211 and the third transition layer 170 on a 19×19×512 feature map output from the third transition layer 170 as an operation result of the third transition layer 170. The second reduction layer 221 performs a 2×2 average pooling operation and a 1×1 convolution operation on a 19×19×1024 feature map output from the second feature block 220 as an operation result of the second feature block 220.

The third feature block 230 sequentially performs the same operation as operations of the second reduction layer 221 and the fourth transition layer 190 on a 10×10×256 feature map output from the fourth transition layer 190 as an operation result of the fourth transition layer 190. The third reduction layer 231 performs a 2×2 average pooling operation and a 1×1 convolution operation on a 10×10×512 feature map output from the third feature block 230 as an operation result of the third feature block 230. The first pyramid convolution layer 234 performs a convolution operation of 128 3×3 filters with a stride of 2 on the 10×10×512 feature map output from the third feature block 230 as the operation result of the third feature block 230.

The fourth feature block 240 sequentially performs the same operation as operations of the third reduction layer 231 and the first pyramid convolution layer 234 on a 5×5×128 feature map output from the first pyramid convolution layer 234 as an operation result of the first pyramid convolution layer 234. The fourth reduction layer 241 performs a 2×2 average pooling operation and a 1×1 convolution operation on a 5×5×256 feature map output from the fourth feature block 240 as an operation result of the fourth feature block 240. The second pyramidal convolution layer 245 performs a convolution operation of 128 3×3 filters with a stride of 2 on the 5×5×256 feature map output from the fourth feature block 240 as the operation result of the fourth feature block 240.

The fifth feature block 250 sequentially performs the same operation as operations of the fourth reduction layer 241 and the second pyramid convolution layer 245 on a 3×3×128 feature map output from the second pyramid convolution layer 245 as an operation result of the second pyramid convolution layer 245. The fifth reduction layer 251 performs a 2×2 average pooling operation and a 1×1 convolution operation on a 3×3×256 feature map output from the fifth feature block 250 as an operation result of the fifth feature block 250. The third pyramid convolution layer 256 performs a convolution operation of 128 3×3 filters with a stride of 2 on the 3×3×256 feature map output from the fifth feature block 250 as the operation result of the fifth feature block 250.

The sixth feature block 260 sequentially performs the same operation as operations of the fifth reduction layer 251 and the third pyramid convolution layer 256 on a 1×1×128 feature map output from the third pyramid convolution layer 256 as an operation result of the third pyramid convolution layer 256. The pyramid pooling layer 261 performs a 2×2 average pooling operation on a 1×1×256 feature map output from the sixth feature block 260 as an operation result of the sixth feature block 260. A 1×1×256 feature map is output from the pyramid pooling layer 261 as an operation result of the pyramid pooling layer 261.

The detection layer 300 generates each class score representing a diagnosis result of a placement error of at least one object for each stage by using the feature data of each stage generated in the operation process of the pyramid network 200. The detection layer 300 includes a plurality of convolution layers 310, 320, 330, 340, 350, and 360. Hereinafter, an operation example of the detection layer 300 on the operation result of the pyramid network 200 described above is described.

The first convolution layer 310 generates a first class score by performing a 3×3 convolution operation on a 38×38×512 feature map output from the first feature block 210 as an operation result of the first feature block 210. The first class score output from the first convolution layer 310 as an operation result of the first convolution layer 310 is represented as a vector value in the form of 38×38×(6×(2+4)). "38×38" of "38×38×(6×(2+4))" corresponds to the size of a grid cell, "6" of "38×38×(6×(2+4))" corresponds to the number of bounding boxes, "2" of "38×38×(6×(2+4))" corresponds to a probability value of the class score, and "4" of "38×38×(6×(2+4))" corresponds to the position and size of the bounding box.

The second convolution layer 320 generates the second class score by performing a 3×3 convolution operation on a 19×19×1024 feature map output from the second feature block 220 as an operation result of the second feature block 220. The second class score output from the second convolution layer 320 as an operation result of the second convolution layer 320 is represented as a vector value in the format of 19×19×(6×(2+4)). "19×19" of "19×19×(6×(2+4))" corresponds to the size of a grid cell, "6" of "19×19×(6×(2+4))" corresponds to the number of bounding boxes, "2" of "19×19×(6×(2+4))" corresponds to a probability value of the first class score, and "4" of "19×19×(6×(2+4))" corresponds to the position and size of the bounding box.

The third convolution layer 330 generates the third class score by performing a 3×3 convolution operation on a 10×10×512 feature map output from the third feature block 230 as an operation result of the third feature block 230. The third class score output from the third convolution layer 330 as an operation result of the third convolution layer 330 is represented as a vector value in the form of 10×10×(6×(2+4)). "10×10" of "10×10×(6×(2+4))" corresponds to the size of a grid cell, "6" of "10×10×(6×(2+4))" corresponds to the number of bounding boxes, "2" of "10×10×(6×(2+4))" corresponds to a probability value of the first class score, and "4" of "10×10×(6×(2+4))" corresponds to the position and size of the bounding box.

The fourth convolution layer 340 generates the fourth class score by performing a 3×3 convolution operation on a 5×5×256 feature map output from the fourth feature block 240 as an operation result of the fourth feature block 240. The fourth class score output from the fourth convolution layer 330 as an operation result of the fourth convolution layer 340 is represented as a vector value in the form of 5×5×(6×(2+4)). "5×5" of "5×5×(6×(2+4))" corresponds to the size of a grid cell, "6" of "5×5×(6×(2+4))" corresponds to the number of bounding boxes, "2" of "5×5×(6×(2+4))" corresponds to a probability value of the first class score, and "4" of "5×5×(6×(2+4))" corresponds to the position and size of the bounding box.

The fifth convolution layer 350 generates the fifth class score by performing a 3×3 convolution operation on a 3×3×256 feature map output from the fifth feature block 250 as an operation result of the fifth feature block 250. The fifth class score output from the fifth convolution layer 350 as an operation result of the fifth convolution layer 350 is represented as a vector value in the form of 3×3×(6×(2+4)). "3×3" of "3×3×(6×(2+4))" corresponds to the size of a grid cell, "6" of "3×3×(6×(2+4))" corresponds to the number of bounding boxes, "2" of "3×3×(6×(2+4))" corresponds to a probability value of the first class score, and "4" of "3×3×(6×(2+4))" corresponds to the position and size of the bounding box.

The sixth convolution layer 360 generates the sixth class score by performing a 3×3 convolution operation on a 1×1×256 feature map output from the pyramid pooling layer 261 as an operation result of the pyramid pooling layer 261. The sixth class score output from the sixth convolution layer 360 as an operation result of the sixth convolution layer 360 is represented as a vector value in the form of 1×1×(6×(2+4)). "1×1" of "1×1×(6×(2+4))" corresponds to the size of a grid cell, the "6" part corresponds to the number of bounding boxes, 2" of "1×1×(6×(2+4))" corresponds to a probability value of the first class score, and "4" of "1×1×(6×(2+4))" corresponds to the position and size of the bounding box.

The bounding box is for determining an object to be diagnosed within the input image in the present embodiment, and as the size of the bounding box varies and the number of bounding boxes increases, objects having various sizes and various characteristics may be accurately determined. The grid cell indicates a data size of 6×(2+4) representing object features by using the bounding box, and in order to represent the object features of various sizes well, grids of various sizes are used in the present embodiment as described above.

Figure 6:
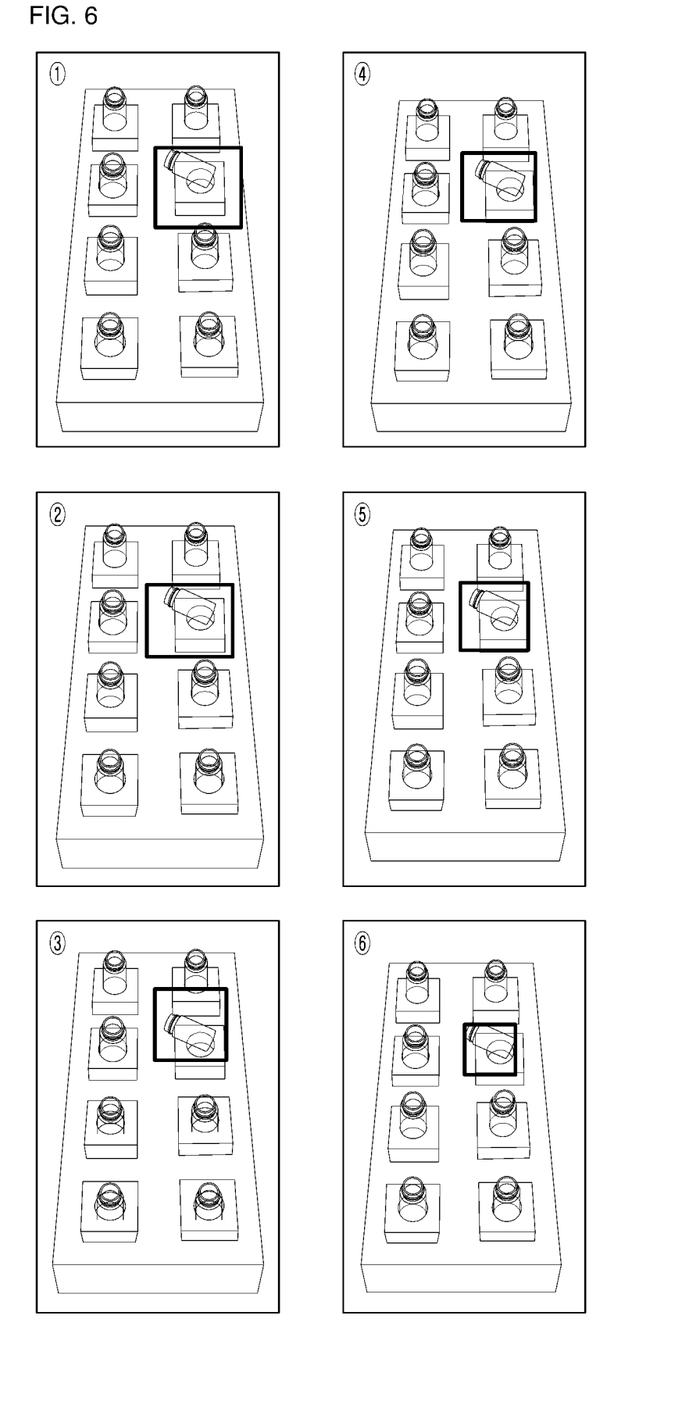
FIG. 6 illustrates examples in which a bounding box overlaps an image captured by the camera illustrated in FIG. 1.

FIG. 6 illustrates examples in which a bounding box overlaps an image captured by the camera illustrated in FIG. 1. Class scores output from the detection layer 300 include a value representing success or failure of placement of each object for each bounding box, a probability value of success or failure of placement of each object, a value representing a position of a bounding box of each object, and a value representing the sized of a bounding box of each object. In order to help understanding of a plurality of class scores output from the detection layer 300, FIG. 6 illustrates that a bounding box overlaps an image of a tray in which eight transparent vials are placed.

The NMS layer 400 selects any one class score from among a plurality of class scores generated by the detection layer 300 by using an NMS algorithm and outputs the selected one class score as data representing a diagnosis result of a placement error of an object. When a probability value of the sixth class score is the highest in the examples illustrated in FIG. 6, the sixth class score is selected, and the sixth class score is output as data representing a diagnosis result of a placement error of an object.

For example, when the class score output from the NMS layer 400 is a vector value in the format of 1×1×(2+4)×N, that is, 1×1×6×N, the 1×1×6 value includes a 1×1 value representing success or failure of the placement of a transparent vial, a 1×1 value representing the probability of success or failure of the placement of a transparent vial, two 1×1 values representing positions of bounding boxes of each transparent vial, and two 1×1 values representing sizes of bounding boxes of the transparent vial. Here, "N" indicates the number of objects (for example, the number of transparent vials) in the input image that is successful in recognizing an object by the NMS layer 400.

In the examples illustrated in FIG. 6, the number of transparent vials is 8, and the class score output from the NMS layer 400 is a vector value in the form of 1×1×6×8. FIG. 6 illustrates only the bounding box for the second transparent vial on the right among eight transparent vials. The two 1×1 values representing the position of the bounding box of each transparent vial may be an x-coordinate value and a y-coordinate value of an upper left corner of the bounding box. The two 1×1 values representing the size of the bounding box of each transparent vial may be a horizontal length value and a vertical length value of the bounding box.

Learning of the artificial neural network 12 described above may be done by repeating a process of inputting a learning image to the main network 100 of the artificial neural network 12 and outputting a learning class score corresponding to the learning image from the NMS layer 400.

In step 35, the processor 11 checks whether the diagnostic data acquired in step 34 represents that there is a placement error of at least one object. As a result of checking in step 35, when the diagnostic data acquired in step 34 represents that there is a placement error of at least one object, step 36 is performed. Otherwise, the process goes back to step 31. When the 1×1 value representing success or failure of placement of each transparent vial among the class scores output from the NMS layer 400 indicates the failure of placement, the process proceeds to step 36.

In step 36, the processor 11 transmits a message representing that there is a placement error of an object in the image received in step 32 to the user terminal 3 through the communication unit 16. Subsequently, the user terminal 3 displays a message representing that there is placement error of an object on the image received from the object placement error diagnosing apparatus 1 to be overlapped with the image. The user interface 15 may display a message representing that there is a placement error of an object on the image received in step 32 to be overlapped with the image. The user terminal 3 includes, for example, a smartphone, a tablet personal computer (PC), a notebook computer, and so on. In addition to the image and message described above, a bounding box may be displayed on the placement error of an object.

Meanwhile, the object placement error diagnosing method according to an embodiment of the present disclosure described above may be written as a program executable by a processor of a computer and may be implemented by a computer that records the program on a computer-readable recording medium and executes the program. The computer includes all types of computers capable of executing programs, such as a desktop computer, a notebook computer, a smartphone, and an embedded-type computer. In addition, the structure of data used in one embodiment of the present disclosure described above may be recorded on a computer-readable recording medium through various means. The computer-readable recording medium includes random access memory (RAM), read-only memory ROM, solid state drive (SSD), magnetic storage media (for example, a floppy disk, a hard disk, and so on), optical reading media (for example, compact disk (CD)-ROM, a digital video disk (DVD), and so on).

Feature data of the (N+1)-th stage among the feature data of a plurality of stages is generated by using any one feature data among a plurality of feature data generated in an operation process of a main network and feature data of the plurality of stages, and a placement error of at least one object is diagnosed by using an artificial neural network of a new structure, and thus, the diagnosis accuracy of a placement error of an object that is difficult to detect an edge, such as a transparent vial, may be greatly increased. Effects of the present disclosure are not limited to the effects described above, and another effect may be derived from the descriptions above.

So far, the present disclosure is described by using preferred embodiments. Those skilled in the art to which the present disclosure pertains will be able to understand that the present disclosure may be implemented in a modified form without departing from the essential characteristics of the present disclosure. Therefore, the disclosed embodiments should be considered from an illustrative point of view rather than a limiting point of view. The scope of the present disclosure is described in the claims rather than the foregoing description, and all differences within the equivalent scope have to be construed as being included in the present disclosure.

What is claimed is:

1. An object placement error diagnosing method comprising:
   inputting, to an artificial neural network, at least one input image representing a space in which at least one object is placed; and
   acquiring data representing a diagnosis result of a placement error of the at least one object from an output of the artificial neural network,
   wherein the artificial neural network comprises:
   a main network configured to perform a convolution operation and a pooling operation on the at least one input image multiple times; and a pyramid network configured to generate feature data of a plurality of stages for generating data representing the diagnosis result of the placement error of the at least one object by using a plurality of feature data generated in an operation process of the main network, and feature data of an (N+1)-th stage among the feature data of the plurality of stages is generated by using any one feature data among the plurality of feature data generated in the operation process of the main network and feature data of an N-th stage among the feature data of the plurality of stages.

2. The object placement error diagnosing method of claim 1, wherein the pyramid network comprises:
an (N+1)-th feature block configured to generate the feature data of the (N+1)-th stage by using any one feature data among the plurality of feature data generated in the operation process of the main network and the feature data of the N-th stage; and
an (N+2)-th feature block configured to generate feature data of an (N+2)-th stage by using any other feature data among the plurality of feature data generated in the operation process of the main network and the feature data of the (N+1)-th stage.

3. The object placement error diagnosing method of claim 2, wherein the pyramid network further comprises:
an N-th reduction layer configured to perform a pooling operation and a convolution operation on the feature data of the N-th stage; and
the (N+1)-th feature block generates the feature data of the (N+1)-th stage by performing a convolution operation and a pooling operation on any one feature data among the plurality of feature data generated in the operation process of the main network and feature data output as an operation result of the N-th reduction layer.

4. The object placement error diagnosing method of claim 3, wherein the pyramid network further comprises:
an N-th pyramidal convolution layer for performing a convolutional operation on the feature data of the (N+2)-th stage;
an (N+2)-th reduction layer configured to perform a pooling operation and a convolution operation on the feature data of the (N+2)-th stage; and
an (N+3)-th feature block configured to generate feature data of an (N+3)-th stage by using feature data output as an operation result of the N-th pyramidal convolution layer and feature data output as an operation result of the (N+2)-th reduction layer.

5. The object placement error diagnosing method of claim 1, wherein
the main network includes a plurality of transition layers for performing a convolution operation and a pooling operation on any one feature data among the plurality of feature data generated in the operation process of the main network such that a size of a feature map is reduced, and
the feature data of the (N+1)-th stage is generated by using feature data output as an operation result of any one of the plurality of transition layers and the feature data of the N-th stage among the feature data of the plurality of stages.

6. The object placement error diagnosing method of claim 2, wherein the main network further includes a plurality of dense block layers that are inserted between the plurality of transition layers and perform a convolution operation on feature data output as an operation result of a previous transition layer according to a DenseNet model such that sizes of feature maps are equal to each other.

7. The object placement error diagnosing method of claim 1, wherein the pyramid network comprises:
a first feature block configured to generate feature data of a first stage by performing a convolution operation and a pooling operation on any one feature data among the plurality of feature data generated in the operation process of the main network; and
a second feature block configured to generate feature data of a second stage by using any other feature data among the plurality of feature data generated in the operation process of the main network and the feature data of the first stage output as an operation result of the first feature block.

8. The object placement error diagnosing method of claim 1, wherein
the at least one object is at least one transparent vial, and
the object placement error diagnosing method further includes generating the at least one input image from a captured image of a tray on which the at least one transparent vial is placed.

9. The object placement error diagnosing method of claim 1, wherein the artificial neural network further includes a detection layer for generating each class score representing a diagnosis result of the placement error of the at least one object for each stage by using feature data of each stage.

10. The object placement error diagnosing method of claim 9, wherein
each class score includes a value representing success or failure of placement of each object, a probability value of success or failure of the placement of each object, a value representing a position of a bounding box of each object, and a value representing a size of the bounding box of each object, and
the artificial neural network further includes a non-maximum suppression (NMS) layer for selecting any one class score from among a plurality of class scores generated in the detection layer by using a non-maximum suppression (NMS) algorithm and outputting the selected one class score as data representing a diagnosis result of the placement error of the at least one object.

11. A non-transitory computer-readable recording medium comprising: a program that is recorded thereon and causes a computer to perform the object placement error diagnosing method of claim 1.

12. An object placement error diagnosing apparatus comprising:
a processor configured to input, to an artificial neural network, at least one input image representing a space in which at least one object is placed, and to acquire data representing a diagnosis result of a placement error of the at least one object from an output of the artificial neural network,
wherein the artificial neural network comprises:
a main network configured to perform a convolution operation and a pooling operation on the at least one input image multiple times; and
a pyramid network configured to generate feature data of a plurality of stages for generating data representing the diagnosis result of the placement error of the at least one object by using a plurality of feature data generated in an operation process of the main network, and
feature data of an (N+1)-th stage among the feature data of the plurality of stages is generated by using any one feature data among the plurality of feature data generated in the operation process of the main network and feature data of an N-th stage among the feature data of the plurality of stages.